(12) United States Patent
Yamasaki

(10) Patent No.: US 8,692,928 B2
(45) Date of Patent: Apr. 8, 2014

(54) AUTOFOCUS APPARATUS AND IMAGE-PICKUP APPARATUS

(75) Inventor: Ryo Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 272 days.

(21) Appl. No.: 13/218,974

(22) Filed: Aug. 26, 2011

(65) Prior Publication Data

US 2012/0057069 A1 Mar. 8, 2012

(30) Foreign Application Priority Data

Sep. 2, 2010 (JP) ................................. 2010-196359

(51) Int. Cl.
*G03B 13/00* (2006.01)
*H04N 5/232* (2006.01)

(52) U.S. Cl.
USPC ............................ 348/351; 348/348; 348/353

(58) Field of Classification Search
USPC .................. 348/345, 348–351, 353
See application file for complete search history.

(56) References Cited

U.S. PATENT DOCUMENTS

| 7,193,651 B2 * | 3/2007 | Kato ............................. 348/349 |
| 7,630,623 B2 * | 12/2009 | Ishii ............................. 396/135 |
| 2008/0198257 A1 * | 8/2008 | Morimoto ..................... 348/345 |
| 2009/0175611 A1 * | 7/2009 | Kiyamura et al. ........... 396/133 |

FOREIGN PATENT DOCUMENTS

| JP | 2006-251065 | 9/2006 |
| JP | 2007-323063 | 12/2007 |
| JP | 2009-003122 | 1/2009 |
| JP | 2009-014850 | 1/2009 |

* cited by examiner

*Primary Examiner* — Daniel M Pasiewicz

(74) *Attorney, Agent, or Firm* — Cowan, Liebowitz & Latman, P.C.

(57) ABSTRACT

An autofocus apparatus includes a first focus detector configured to provide a focus detection by detecting a phase difference between a pair of image signals of an object, a second focus detector configured to wobble one of an image-pickup lens and an image-pickup element, to observe a variation of a contrast value of an image of the object, and to maintain an in-focus position, and a controller configured to make the first focus detector provide the focus detection in the wobbling by the second focus detector, and to correct a shift amount of an amplitude of wobbling by the second focus detector in the focus detection result by the first focus detector.

4 Claims, 4 Drawing Sheets

AUTOFOCUS APPARATUS AND IMAGE-PICKUP APPARATUS

BACKGROUND OF THE INVENTION

1. Field of the Invention

The present invention relates to an autofocus apparatus and an image-pickup apparatus.

2. Description of the Related Art

Japanese Patent Laid-Open No. ("JP") 2006-251065 hybrid autofocus ("AF") that combines AF of a contrast method ("contrast AF" hereinafter") with phase difference AF using a focus detector. JP 2009-003122 discloses an image-pickup element that includes focus detecting pixels and a pupil splitter and serves as phase difference AF ("SAF" (image-pickup plane phase difference AF) hereinafter)).

JP 2009-014850 discloses contrast AF that includes mountain-climbing AF used to search for a peak position of a contrast value by driving one of a focus lens and an image-pickup element in one direction, and wobbling AF configured to wobble the one to maintain focusing. For example, the mountain-climbing AF is performed for a large defocus amount and the wobbling AF is performed near an in-focus position to follow a moving body in the motion image photography using the contrast AF. JP 2007-323063 discloses a phase difference AF using a secondary imaging optical system.

The conventional contrast AF is disadvantageous because it takes much time to follow or cannot follow a moving object.

SUMMARY OF THE INVENTION

The present invention provides an autofocus apparatus and an image-pickup apparatus which can improve following performance onto a moving object using contrast AF.

An autofocus apparatus according to the present invention includes a first focus detector configured to provide a focus detection by detecting a phase difference between a pair of image signals of an object, a second focus detector configured to wobble one of an image-pickup lens and an image-pickup element, to observe a variation of a contrast value of an image of the object, and to maintain an in-focus position, and a controller configured to make the first focus detector provide the focus detection in the wobbling by the second focus detector, and to correct a shift amount of an amplitude of wobbling by the second focus detector in the focus detection result by the first focus detector.

Further features of the present invention will become apparent from the following description of exemplary embodiments with reference to the attached drawings.

DESCRIPTION OF THE EMBODIMENTS

Figure 1:
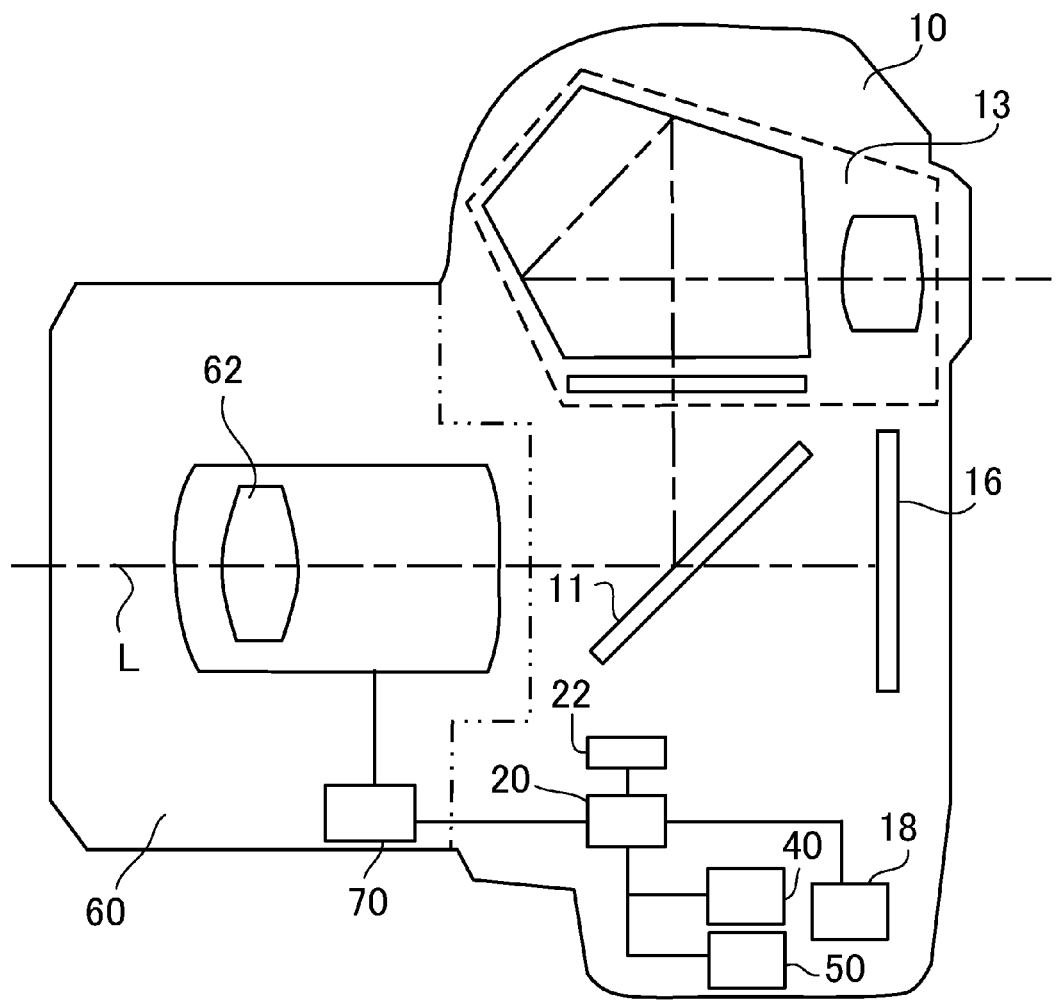
FIG. 1 is a block diagram of a digital camera applicable to the present invention.

FIG. 1 is a block diagram of a principal part relating to focusing of a digital camera (image-pickup apparatus) according to this embodiment. The digital camera of this embodiment is a lens exchangeable single-lens reflex camera including a camera body 10 and a lens unit 60. An image-pickup apparatus applicable to the present invention does not limit a type of a camera, and may be a digital video camera and a lens integrated camera.

The lens unit 60 is attached to and detached from the camera body 10, and includes an image-pickup lens 62 and a lens MPU 70. The camera body 10 and the lens unit 60 are mechanically and electrically connected to each other via connectors (not illustrated) provided to mounts illustrated in an alternate long and two short dashes line.

The image-pickup lens 62 forms an optical image and includes a focus lens (not illustrated) configured to move in an optical axis direction so as to provide focusing as illustrated in an alternate long and short dashes line. In FIG. 1, "L" denotes an optical axis of the image-pickup lens 62.

The lens MPU 70 is configured to provide all calculations and controls relating to the image-pickup lens 62, and controls driving of the focus lens in the image-pickup lens 62. The lens MPU 70 can also wobble the focus lens in accordance with an instruction from a camera MPU 20. Moreover, the lens MPU 70 detects a current lens position, and informs the camera MPU 20 of lens position information in response to a request from the camera MPU 20.

The camera body 10 includes a main mirror 11, a viewfinder optical system 13, an image-pickup element 16, an image processor 18, the camera MPU 20, a memory 22, an image-pickup plane phase difference AF unit ("SAF" unit) 40, and a contrast AF unit 50. The camera MPU 20, the SAF unit, and the contrast AF unit 50 constitute an autofocus apparatus.

The main mirror 11 is provided between the image-pickup lens 62 and the image-pickup element 16 and configured to stay in an optical path from the image-pickup lens 62 to the image-pickup element 16 in the observation time using the viewfinder optical system 13, and to retreat from the light flux in the image-pickup time. The main mirror 11 includes a half-mirror, and is configured to split a light flux from the image-pickup lens 62 into reflected light to the viewfinder optical system 13 and transmitting light to a sub-mirror (not illustrated). The reflected light forms an image on a matt plane of a focus plate (not illustrated), and an image on the matt plane is observed by a photographer through a penta-prism and an eyepiece.

The image-pickup element 16 includes a CCD sensor or a CMOS sensor and its peripheral circuit, in which one photo-electric conversion element is arranged on a light receiving pixel that includes m pixels in a horizontal direction and n pixels in a vertical direction. The image-pickup element 16 is configured to provide a photoelectric conversion for an object image. The image-pickup element 16 is configured to provide an independent output for each of all pixels. The image-pickup element 16 includes some pixels each of which serves as a focus detecting pixel to provide SAF on the image-pickup plane.

More specifically, the image-pickup element 16 includes a plurality of image-pickup pixels configured to receive light that passes the whole area of an exit pupil of the image-pickup lens and to provide a photoelectric conversion for an object image, and a plurality of focus detecting pixels configured to receive light from part of the area of the exit pupil of the image-pickup lens and to provide a photoelectric conversion for an object image. The image-pickup element 16 further includes a pupil splitter configured to guide light fluxes passing different areas of the exit pupil of the image-pickup lens 62 to corresponding focus detecting pixels.

For example, in the image-pickup element 16, a pair of diagonally arranged G pixels as image-pickup pixels remains, and R and B pixels are replaced with focus detecting pixels. The pupil splitter includes a micro lens and a wiring layer having an aperture as in FIGS. 6 and 7 and relevant description in JP 2009-003122.

The image-pickup element 16 thus includes image-pickup pixels and focus detecting pixels. The focus detecting pixels are discretely arranged, and configured to detect a focusing state using an image signal that combines discrete pixel outputs at the focus detection time. At the image-pickup time, the focus detecting pixels are treated as defective pixels and a taken image is formed by performing defect correcting processing, such as an interpolation calculation using surrounding pixels.

The image processor 18 provides predetermined processing, such as the γ conversion, the color interpolation, and the JPEG compression, to image data derived from the image-pickup element 16 and an A/D converter (not illustrated). The image data corresponding to the focus detection among the obtained image data is converted into focus detecting image data by the image processing circuit 18, and sent to the camera MPU 20.

The camera MPU (controller) 20 is a microcomputer (processor) configured to provide all operations and controls relating to the camera body 10. The camera MPU 20 is connected to and can communicate with the lens MPU 70. The camera MPU 20 is configured to request the lens MPU 70 to obtain a position of the image-pickup lens 62, to drive the image-pickup lens with a predetermined driving amount, and to acquire optical information (such as a focal length) peculiar to the lens unit 60.

The camera MPU 20 is configured to provide AF control used to drive the focus lens via the lens MPU 70 based on the focus detection results by the SAF unit 40 and the contrast AF unit 50. The camera MPU 20 instructs the SAF unit 40 to provide a focus detection in wobbling in the wobbling AF by the contrast AF unit 50. The camera 20 serves as a controller configured to correct a shift amount of an amplitude of wobbling in the wobbling AF by the contrast AF unit 50 using Expressions 1 and 2, which will be descried later, and a defocus amount as the focus detection result by the SAF unit 40.

The memory 22 stores information necessary for an operation of the camera MPU 20. For example, the memory 22 stores a program used to execute a focusing method, which will be described later, and a first threshold, a second threshold, and a third threshold used for the program, which will be described later.

The SAF unit 40 serves as a first focus detector configured to detect a focusing state of the image-pickup lens 62 using a phase difference method and focus detecting pixels embedded in the image-pickup element 16. In other words, the SAF unit 40 detects a phase difference between a pair of object images formed by the focus detecting pixels of the image-pickup element 16 and the light fluxes that pass a pair of pupil areas of the image-pickup lens 62, and detects the focusing state of the image-pickup lens 62 using a well-known correlation operation.

Figure 5:
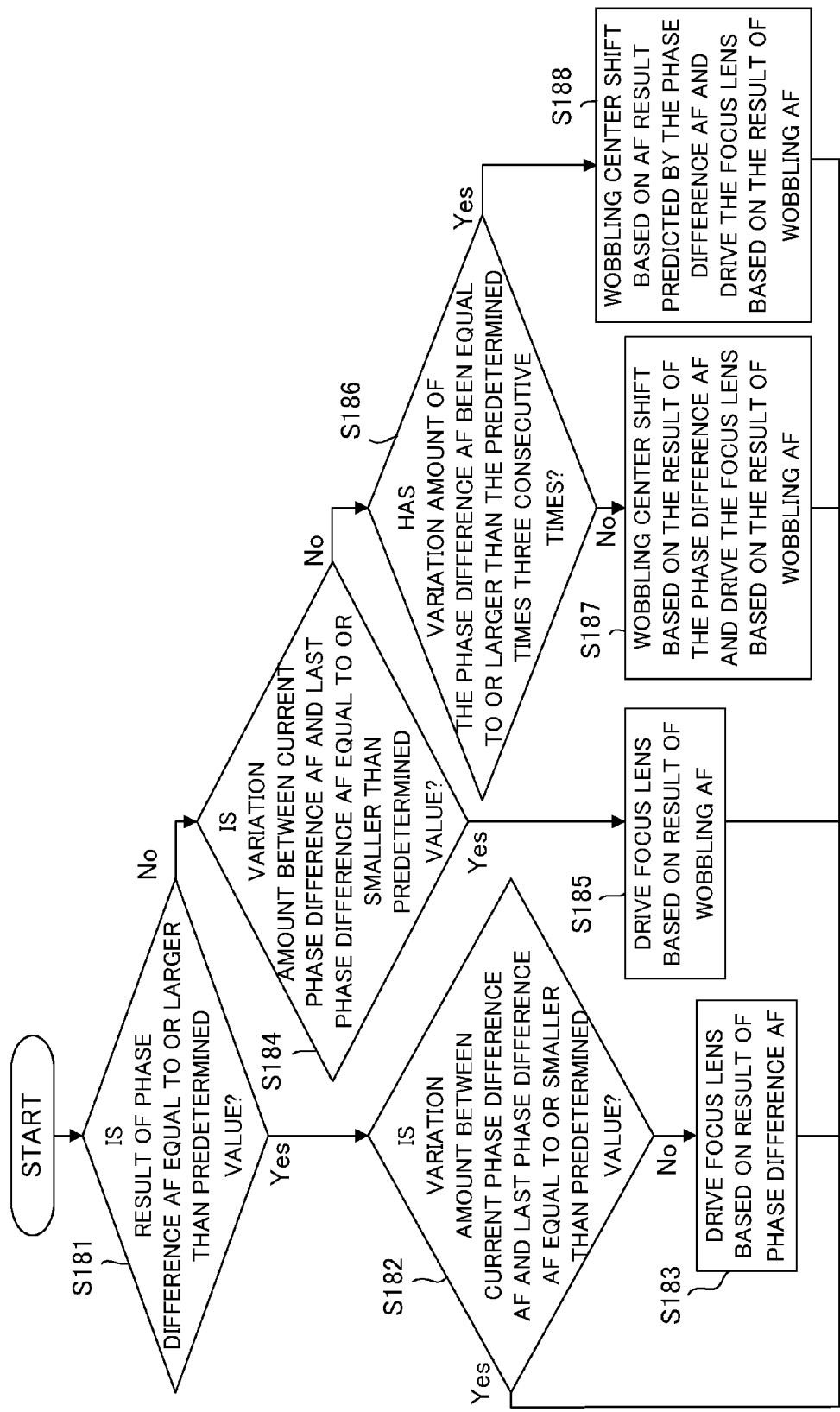
FIG. 5 is a detailed flowchart of S180 illustrated in FIG. 4.

The SAF principle is similar to that described in FIGS. 5-7 and relevant description in JP 2009-003122, and the SAF unit 40 includes a combining unit, a coupling unit, and a calculating unit as disclosed in FIG. 8 of JP 2009-003122.

The phase difference AF applicable to the present invention is not limited to the SAF. For example, the phase difference AF may use (internally or externally measuring) phase difference AF using a dedicated sensor (line sensor), and phase difference AF of a secondary imaging type using a mirror split optical-path disclosed in JP 2007-323063.

The contrast AF unit 50 serves as a second focus detector configured to provide focus detections based on a contrast detecting method using a contrast component in image information obtained by the image processing circuit 18.

The contrast AF has a mountain-climbing mode configured to detect a position of a focus lens which corresponds to a peak of a contrast value by moving the focus lens based on the so-called a mountain-climbing method and focus detecting frames each of which defines a focus detecting area.

The contrast AF also includes a wobbling AF mode configured to wobble one of the image-pickup lens 62 and the image-pickup element 16 so that a distance between them can change near the in-focus position, and to observe a variation of the contrast value of an image of the object so as to maintain the in-focus position of the object. The focus lens in the image-pickup lens 62 is driven in the wobbling AF in this embodiment, as described above.

Figure 2:
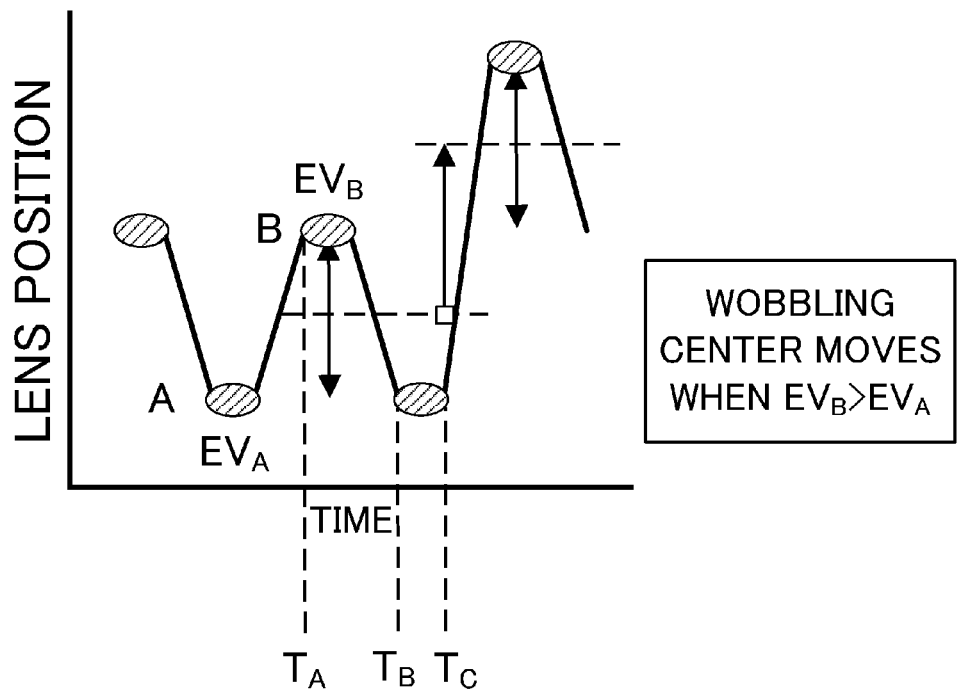
FIG. 2 is a graph for explaining wobbling AF.

FIG. 2 is a graph for explaining an operation of the focus lens in the wobbling AF, where an abscissa axis denotes time, and an ordinate axis denotes a position of the focus lens. In FIG. 2, a contrast evaluated value $EV_A$ calculated by the contrast AF unit corresponding to an image signal (expressed by an eclipse with oblique lines) accumulated in the image-pickup element 16 during a time period "A" is taken in at time $T_A$. A contrast evaluated value $EV_B$ calculated by the contrast AF unit 50 corresponding to an image signal (expressed by an eclipse with oblique lines) accumulated in the image-pickup element 16 during a time period "B" is taken in at time $T_B$. At time $T_C$, the evaluated value $EV_A$ is compared with the evaluated value $EV_B$, and a wobbling center is moved when $EV_B > EV_A$. On the other hand, when $EV_A > EV_B$, the wobbling center is not moved. Focusing is maintained by repeating the above procedure.

While the focus lens is moved in the AF according to this embodiment, the image-pickup element 16 may be moved as long as a relative interval between a focus position formed by the image-pickup lens 62 and the image-pickup element 16 is varied.

Since the SAF provides pupil splitting using the image-pickup element 16, the focus detection precision lowers due to light shields by the image-pickup lens 62. Accordingly, this embodiment utilizes the SAF for comparatively significant image blurs or for use with auxiliary focus detection to the contrast AF, and the contrast AF near the in-focus position. Thereby, this embodiment reduces a focusing time period for significant blurs and highly precise focusing onto the moving object. In addition, this embodiment detects a movement of the object and maintains focusing by always using the SAF during the contrast AF.

Figure 3:
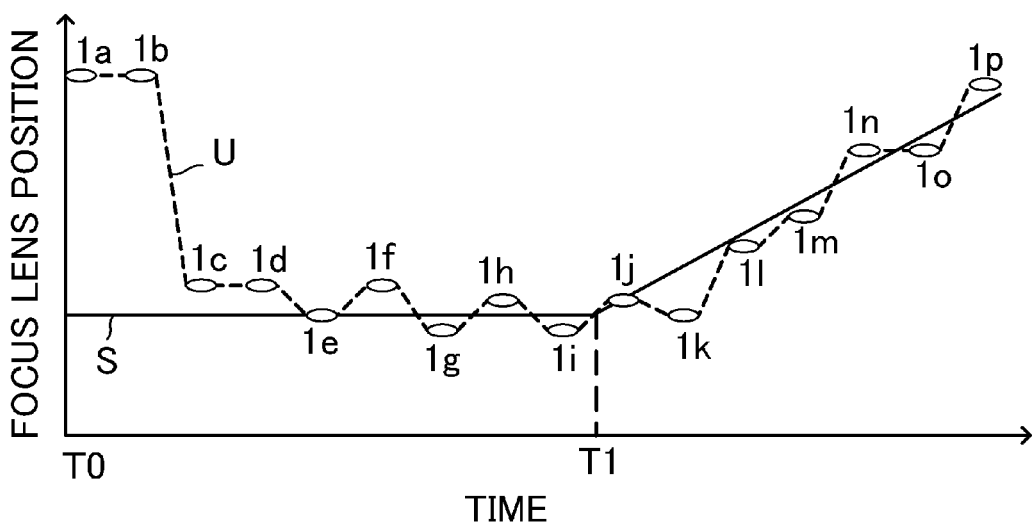
FIG. 3 is a graph for explaining a focusing method of this embodiment.

FIG. 3 is a graph for explaining following the object using the hybrid AF according to this embodiment, where an abscissa axis denotes time and an ordinate axis denotes a focus lens position. A solid line S is made by converting an image plane moving locus of an object into a locus of the focus lens. It is assumed that the object S stop moving in a period from time T0 to time T1 and the focus lens moves at a uniform velocity after the time T1 for simplification of the description. A dotted line U represents that the focus lens follows the object under the hybrid AF according to this embodiment.

Each of eclipses 1a to 1b indicates an accumulating time period of an image signal spent by the image-pickup element 16. Initially, an image signal is accumulated in the eclipse 1a and an accumulated image signal is read out until the eclipse 1*b* starts, and an evaluated value by the contrast AF and a defocus amount by the SAF (phase difference AF) are calculated.

In the eclipse 1*b*, a defocus amount of the eclipse 1*a* is equal to or larger than a predetermined value (first threshold), and the focus lens is driven only by the SAF's result and moved to the eclipse 1*c*. In the eclipse 1*c*, an evaluated value and a defocus amount are similarly calculated for the image signal accumulated in the eclipse 1*b*. At this time, even when the defocus amount is equal to or larger than the predetermined amount, if a variation amount between the last defocus amount (eclipse 1*a*) and the current defocus amount (eclipse 1*b*) is equal to or smaller than the predetermined amount (second threshold), the focus lens is not driven as illustrated by an eclipse 1*d*.

In the eclipse 1*d*, an evaluated value and a defocus amount for the eclipse 1*c* are calculated. When the defocus amount is equal to or smaller than the predetermined value (second threshold), the wobbling AF is initiated. For eclipses 1*d* to 1*i*, the focus lens is controlled in accordance with the wobbling AF. Even in the wobbling AF time periods for the eclipses 1*d* to 1*i*, the defocus amount is calculated by the SAF. By observing a variation of the defocus amount, the moving object can be followed.

When the SAF is conducted in the wobbling AF, the defocus amount changes as if the object acts like a moving object due to the wobbling AF. For example, in the time period from the eclipse 1*g* to the eclipse 1*h*, the object stands still. Nevertheless, due to the influence of the wobbling AF, a defocus amount with the image signal accumulated in the eclipse 1*h* varies from a defocus amount with the image signal accumulated in the eclipse 1*g*. As a result, the object can be determined as a moving object by mistake.

Accordingly, this embodiment improves the precision of the SAF (phase difference AF) that is performed during the wobbling AF by correcting a shift of amplitude caused by the wobbling AF. Where "F" is defined as an F-number of the image-pickup lens 62, and "δ" is defined as a permissible circle-of-confusion diameter on the image-pickup element 16, amplitude W on the image-pickup element 16 of the wobbling AF can be expressed as follows:

$$W = k \times F \times \delta \qquad \text{Expression 1}$$

Herein, k is a constant to determine a magnitude of the amplitude, and often uses a numerical value smaller than 1, such as ¼ and ⅓. Where $P_1$ is a defocus amount by the SAF that is performed during the wobbling AF, defocus amount $P_2$ in which the influence of the wobbling AF is corrected can be expressed as follows:

$$P2 = P1 \pm 0.5 \times W \qquad \text{Expression 2}$$

In Expression 2, the ± sign is provided because a correcting direction changes depending upon whether the position of the focus lens is located on the closest side or the infinity side in the wobbling AF.

The following correction can realize the highly precise SAF that is performed during the wobbling AF. According to this embodiment, the variation amount of the defocus amount is equal to or smaller than the predetermined value in the period from the eclipse 1*d* to the eclipse 1*i*, and thus the object is regarded as a stationary object and only the wobbling AF is performed for focusing.

In the eclipse 1*j*, an evaluated value and a defocus amount are calculated for the eclipse 1*i*. At this time, the object S has been moved but only a result of the eclipse 1*i* cannot enable a movement of the object to be detected and the wobbling AF continues.

In the eclipse 1*k*, an evaluated value and a defocus amount are calculated for the eclipse 1*j*. Since the defocus amount is larger than the predetermined value (second threshold), an amplitude center position of the wobbling AF is moved to a focus position by this variation amount. The influence of the wobbling AF has been corrected by Expression 2 in this SAF's result.

In the eclipse 1*l*, similar to the eclipse 1*k*, the amplitude center of the wobbling AF is moved.

In the eclipse 1*m*, an evaluated value and a defocus amount are calculated for the eclipse 1*l*. In the eclipse 1*m*, a variation of the defocus amount by the phase difference A has been observed three consecutive times (third threshold times) at the eclipse 1*j*, the eclipse 1*k*, and the eclipse 1*l*. Therefore, the image plane moving speed of the object predicted from the SAF's result is calculated, and the amplitude center is moved based on this image plane moving speed of the object.

In eclipses 1*m* to 1*p*, the moving object S is followed based on both the predicted AF by the SAF and the wobbling AF. The influence of the wobbling AF has been corrected by Expression 2 in this SAF's result.

Thus, this embodiment enables excellent following onto the moving object using the wobbling AF and SAF, and improves the precision of the SAF by correcting the influence of the amplitude movement of the wobbling AF.

Figure 4:
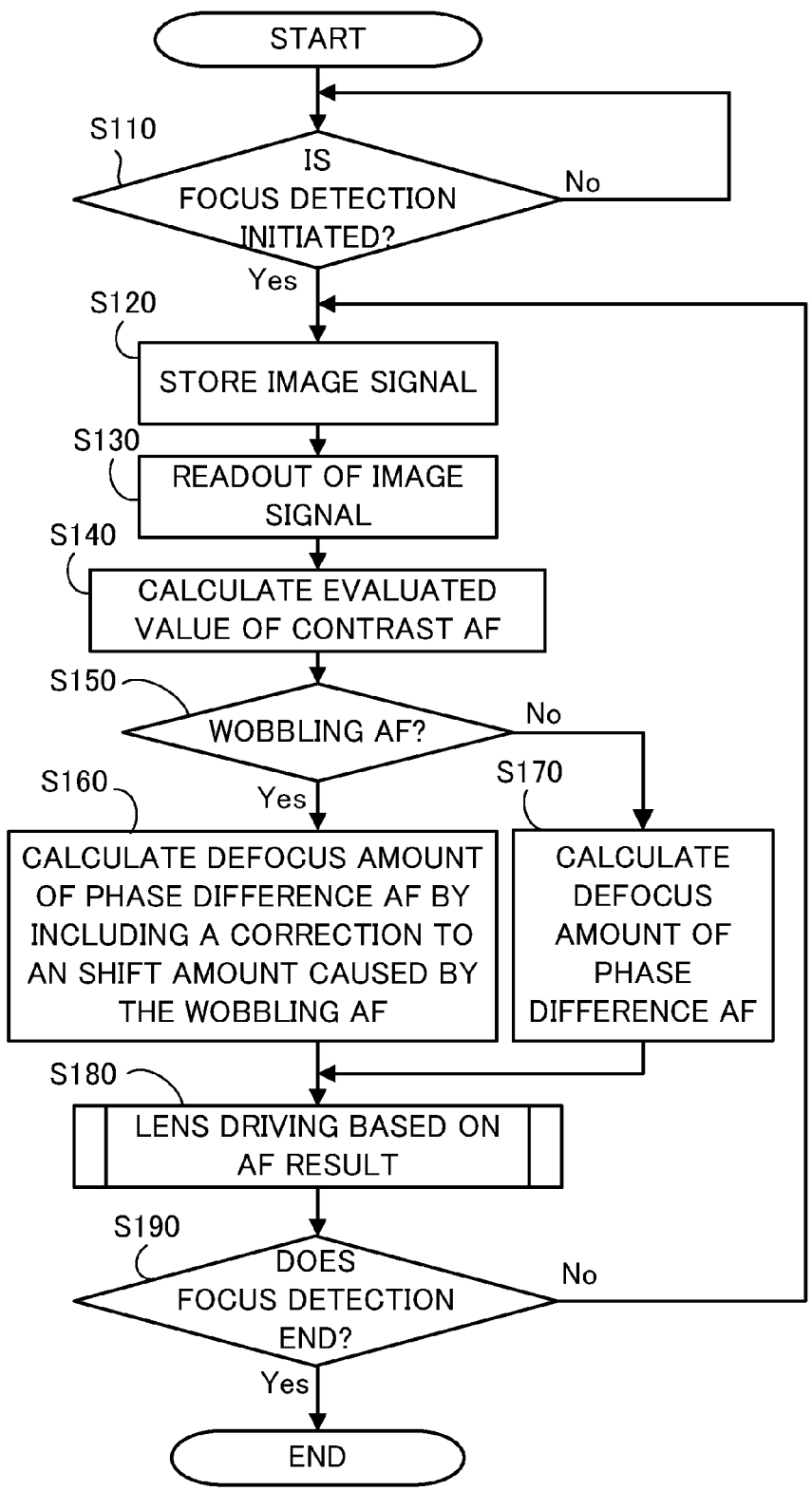
FIG. 4 is a flowchart for explaining a focus detecting method of this embodiment.

Next, a description will be given of a focusing method performed by the camera MPU 20. FIG. 4 is a flowchart for explaining focusing performed by the camera MPU 20. In FIG. 4, "S" stands for the step, and this is true of FIG. 5, which will be described later.

Initially, when determining that the focus detection is initiated in response to an operation of an operating unit (not illustrated) (S110), the camera MPU 20 stores an image signal from the image-pickup element (S120). Thereafter, the camera MPU 20 reads out the stored image signal (S130), sends it to the contrast AF unit 50 via the image processing circuit 18, and calculates an evaluated value of the contrast AF using the contrast AF unit 50 (S140).

Next, the camera MPU 20 determines whether the lens was driven under the wobbling AF when the image signal is stored at S120 (S150).

When determining that the wobbling AF was performed in S150 (Yes of S150), the camera MPU 20 calculates an SAF corrected defocus amount using Expressions 1 and 2 (S160). On the other hand, when determining that no wobbling AF was performed in S150, (No of S150) the camera MPU 20 calculates only the defocus amount of the SAF's detection result using the SAF unit 40 (S170).

After S160 or S170, the camera MPU 20 drives the focus lens in the image-pickup lens 62 based on the evaluated value or the defocus amount calculated by S140 to S170 (S180).

FIG. 5 is a flowchart for explaining details of S180. Initially, the camera MPU 20 determines whether the defocus amount as the focus detection result by the SAF is equal to or larger than the predetermined value (S181).

When determining that the defocus amount is equal to or larger than the predetermined value (first threshold) (Yes of S181), the camera MPU 20 determines whether a variation amount between the last defocus amount of the phase difference AF and the current defocus amount of the phase difference AF is equal to or smaller than the predetermined value (second threshold) (S182). When determining that the variation amount between the last defocus amount of the phase difference AF and the current defocus amount of the phase difference AF is equal to or larger than the predetermined value (No of S182), the camera MPU 20 drives the focus lens in the image-pickup lens 62 only using the SAF's result (S183).

On the other hand, when determining that the defocus amount is larger than the predetermined value (first threshold) (No of S181), the camera MPU 20 determines whether the variation amount between the last SAF's defocus amount and the current SAF's defocus amount is equal to or smaller than the predetermined value (second threshold) (S184).

When determining that the variation amount between the last SAF's defocus amount and the current SAF's defocus amount is equal to or smaller than the predetermined value (Yes of S184), the camera MPU 20 drives the focus lens in the image-pickup lens 62 using the wobbling AF (S185). Herein, the wobbling amplitude is set based on the F number information of the image-pickup lens 62, the previously stored permissible circle-of-confusion diameter δ, and the coefficient k.

On the other hand, when determining that the variation amount between the last SAF's defocus amount and the current SAF's defocus amount is larger than the predetermined value (No of S184), the camera MPU 20 determines whether the variation amount of the SAF's defocus amount has been larger than the predetermined value three times (third threshold) or more (S186).

When determining that the variation amount has not yet been larger three times or more (No of S186), the camera MPU 20 calculates the moving amount of the amplitude center of the wobbling AF using the defocus amount and moves the amplitude center by the calculated amount (S187). The influence of the wobbling AF has been corrected by Expression 2 in this SAF's result.

When determining that the variation amount has been larger three times or more (Yes of S186), the camera MPU 20 calculates the image plane moving speed of the object predicted by the focus detection result by the SAF unit 40, and moves the amplitude center based on the image plane moving speed (predicted AF). Thereafter, the camera MPU 20 drives the focus lens by adding the amplitude movement of the wobbling AF (S188).

On the other hand, when determining that the variation amount between the last and current defocus amounts of the phase difference AF is equal to or smaller than the predetermined value (Yes of S182), the focus lens is not driven and the instant flow ends. Similarly, the camera MPU 20 ends this flow after S183, S185, S187, or S188.

Turning back to FIG. 4, the camera MPU 20 finally determines whether the focus detection action ends (S190), and if so, completes the flow. Otherwise, the flow returns to S102.

According to this embodiment, the influence of the amplitude movement of the wobbling AF is corrected in the SAF that is performed during the wobbling AF. Thereby, the focusing time period can be shortened for significant blurs in the motion image photography and improves the focusing precision for the moving object. Therefore, the following performance onto the moving object can be enhanced in the contrast AF.

The focusing method illustrated in FIGS. 4 and 5 can be executed by a computer implemented program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-196359, filed Sep. 2, 2010 which is hereby incorporated by reference herein in its entirety.

What is claimed is:

1. An autofocus apparatus comprising:
    a first focus detector configured to provide a focus detection by detecting a phase difference between a pair of image signals of an object;
    a second focus detector configured to wobble one of an image-pickup lens and an image-pickup element, to observe a variation of a contrast value of an image of the object, and to maintain an in-focus position; and
    a controller configured to make the first focus detector provide the focus detection in the wobbling by the second focus detector, and to correct the focus detection result of the first focus detector with a shift amount of an amplitude of wobbling by the second focus detector.

2. The autofocus apparatus according to claim 1, wherein the controller is configured to move, by an amount corresponding to a variation amount of the focus detection result by the first focus detector, a center of the amplitude by the wobbling by the second focus detector when a defocus amount as the focus detection result by the first focus detector is smaller than a first threshold and a variation amount of the defocus amount is larger than a second threshold.

3. The autotheus apparatus according to claim 2, wherein the controller is configured to provide focusing using a focus detection result by the second focus detector when the variation amount of the defocus amount has not been larger than the second threshold third threshold times consecutively, and
    wherein the controller is configured, when the variation amount of the defocus amount has been larger than the second threshold the third threshold times consecutively, to calculate an image plane moving speed predicted from the focus detection result by the first focus detector and to move the center of the amplitude based on the image plane moving speed.

4. An image-pickup apparatus comprising an autofocus apparatus according to claim 1.

* * * * *